Oct. 14, 1947.  A. Y. DODGE ET AL  2,429,091
TORQUE TRANSMITTING COUPLING
Filed Oct. 2, 1944

Inventors:
Adiel Y. Dodge
Roy W. Hays
By Dawson, Ooms & Booth
Attorneys

Patented Oct. 14, 1947

2,429,091

UNITED STATES PATENT OFFICE 2,429,091

TORQUE TRANSMITTING COUPLING

Adiel Y. Dodge and Roy W. Hays, Rockford, Ill.;
said Hays assignor to said Dodge Application October 2, 1944, Serial No. 556,813

8 Claims. (Cl. 192—104)

This invention relates to torque transmitting couplings and more particularly to a coupling for drivably connecting two rotatable members and which functions to disconnect the members when the load thereon exceeds a predetermined maximum.

One of the objects of the invention is to provide a coupling which automatically releases in response to a predetermined load and which automatically re-engages when the load is removed.

Another object is to provide a coupling which runs freely with a minimum amount of drag in its released condition.

Still another object is to provide a coupling which is controlled at least in part in response to speed to maintain the coupling parts in released condition when the speed exceeds a predetermined maximum.

A further object of the invention is to provide a coupling which is maintained in released condition in response to substantially less torque and/or speed than is required to effect initial release of the coupling.

A still further object is to provide a coupling which operates efficiently under conditions of misalignment between the driving and driven shafts.

The above and other objects and advantages of the invention will be more readily apparent from the following description when read in connection with the accompanying drawing, in which—

Figure 1:
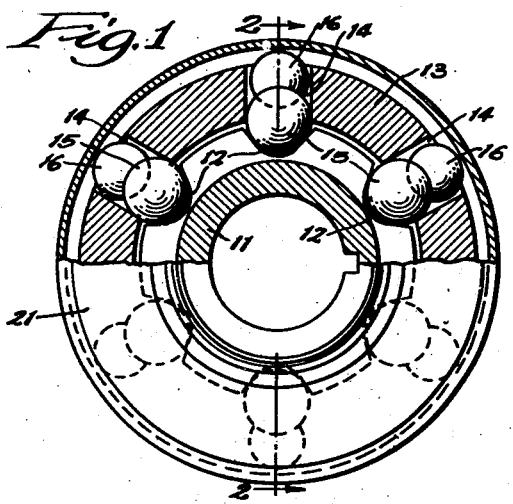
Figure 1 is an end elevation of a coupling embodying the invention with parts in section substantially on the line 1—1 of Figure 2.
Figure 2:
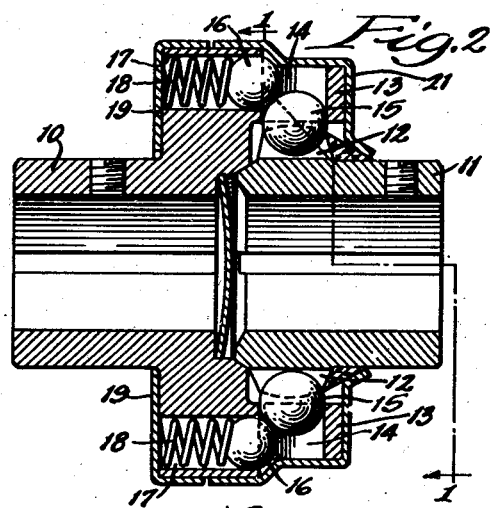
Figure 2 is an axial section on the line 2—2 of Figure 1.

The coupling shown in Figures 1 and 2 is designed to connect relatively rotatable driving and driven shafts and includes a sleeve 10 adapted to be connected to the driving shaft and a similar sleeve 11 adapted to be connected to the driven shaft. The sleeve 11 is formed at its inner end with an enlarged portion provided with a series of peripheral cam notches 12 opening outwardly of the driven sleeve 11. The driving member 10 has an enlarged head portion 13 encircling the inner end of the driven member 11 and overlying the cam notches 12.

In order to connect the driving and driven members for transmission of torque therebetween, the head portion 13 is formed with a series of radially extending bores 14 in which cam members 15 are slidably mounted for radial movement toward and away from the notches 12. The cam members 15 in the form shown in Figures 1 and 2, may be bearing balls which are of a proper size to fit within the notches 12 as seen in Figure 1 to provide a driving connection between the driving and driven members. The balls 15 are urged toward the notches by cam members 16 which may also be in the form of bearing balls and which are preferably of slightly smaller diameter than the balls 15. The balls 16 are slidable in axially extending bores 17 in the head 13 and are urged toward the balls 15 by compression springs 18. The springs may be held in place by shell members 19 fitting over the head portion 13. Preferably additional shell or housing members 21 are provided fitting over the head 13 completely to enclose the several parts of the coupling.

In operation the springs 18 acting thru the balls 16 normally cam the balls 15 into the notches 12 to connect the driving and driven members. When the torque load between the driving and driven members exceeds a predetermined value depending upon the strength of the springs 18, the balls 15 will be cammed outwardly in the bores 14 to move the balls 16 to the left. The balls 15 will disengage the notches 12 to interrupt the connection between the driving and driven members so that the driving member may overrun the driven member.

Since the balls 15 are movable radially outward in the bores 14 they will tend to move outwardly to disengage position in response to centrifugal force thereon. The cooperating surfaces of the balls 15 and 16 is such as to provide a plurality of different cam angles sloping in the same general direction from the line of motion of the balls 15 so that the springs 18 will have a greater mechanical advantage over the balls 15 when they are in their engaged position than when they are in their disengaged position. Thus, a lesser force is required acting on the balls 15 to hold them out of engagement with the notches 12 than is required initially to move the balls 15 out against the springs 18. Thus with this construction, by properly proportioning the springs and the size of the balls 15, the balls may be so made that they will be held in their outermost disengaged positions in response to speed alone. Thus the coupling once it is disengaged may overrun freely with no drag between its driving and driven parts. Normally with the balls 15 in their engaged position, the effect of speed thereon is subordinate to the torque effect so that the balls will not disengage unless the speed reaches an extremely high value except when the torque exceeds the value for which the springs are designed.

Figure 3:
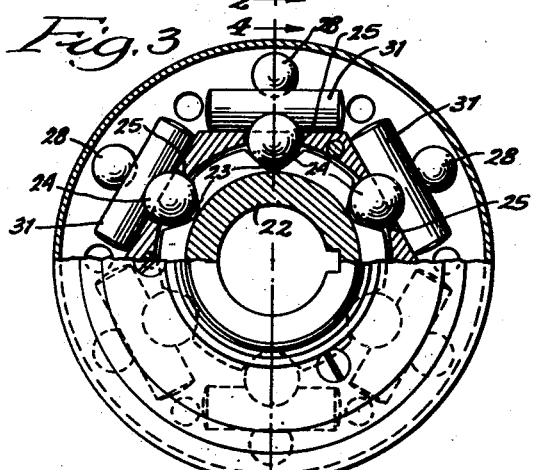
Figure 3 is a view similar to Figure 1 of an alternative construction on the line 3—3 of Figure 4.
Figure 4:
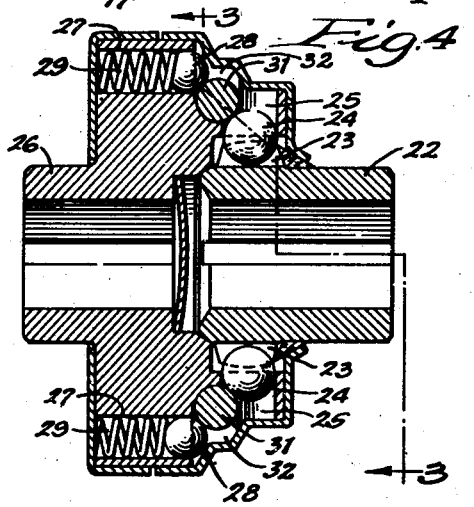
Figure 4 is a section on the line 4—4 of Figure 3.

If it is desired to make the coupling speed responsive to a greater extent and somewhat less torque responsive a construction such as that shown in Figures 3 and 4 may be employed. In this construction the driven member 22 is formed in its outer periphery with a series of cam notches 23 to receive driving balls 24 carried in radial bores 25 by the driving member 26. The driving member 26 is formed with a series of axial bores 27 carrying cam balls 28 which are urged toward the bore 25 by springs 29.

Interposed between the driving balls 24 and the cam balls 28 are roller members 31 whose ends extend into radial extending slots or grooves 32 in the driving member. The rollers 31 may be made of any desired length and weight to be more or less responsive to speed.

In operation, the balls and rollers provide cam angles which vary in accordance with the radial positions of the driving balls 24 and of the rollers 31 so that the springs 29 have greater mechanical advantage over the rollers 31 when balls 24 are in their engaged position than when they are in their disengaged position. Centrifugal force acting on the rollers as well as on the balls 24 tends to move them radially outward to help disengage the balls 24 from the notches and to hold the cam balls 28 to the left against the springs 29. The relatively large amount of weight provided by the rollers 31 makes this construction much more sensitive to speed changes than that of Figures 1 and 2 so that it can be designed to disengage in response to a predetermined speed and to remain disengaged until the speed reaches a substantially lower value. With this construction as well as with that of Figures 1 and 2, the driving balls will automatically be cammed back toward engagement with the cam notches as soon as the torque load is removed or reduced to a point where the springs can again move the cam balls to their driving position. The cover 21 Figure 1 is so proportioned that balls 15 are stopped in an outer position such that the angle existing between balls 16 and 15 is somewhat greater than a locking angle. It will be apparent that if the driving balls should fail to register with the cam notches a slight relative turning movement of the driving and driven members will move them into registering position so that the drive will be reestablished.

Figure 5:
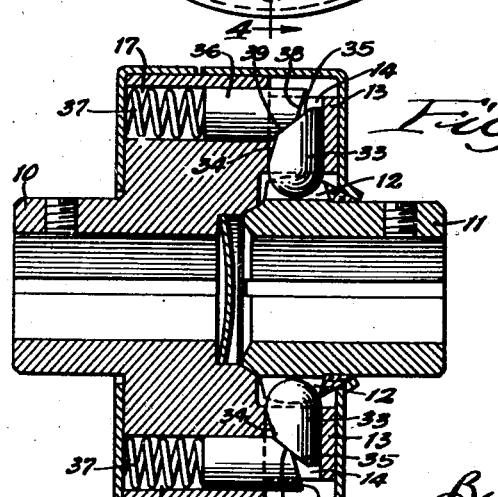
Figure 5 is an axial section of still another alternative construction.

Figure 5 illustrates an alternative construction similar to Figure 1 and parts therein corresponding to like parts in Figure 1 are indicated by the same reference numerals. In this construction the balls 15 are replaced by plug members 33 which are slidable in the radially extending bores 14. The plug members are formed with rounded inner ends to engage in the cam notches 12 and at their outer ends are shaped to provide connected cam surfaces 34 and 35 forming different angles with the line of movement of the plug members. The plug members are cammed toward a position to engage the notches by cam members 36 slidable in the axial bores 17 and which are urged toward the plug members by springs 37. The outer ends of the cam members 36 are formed with connected cam surfaces 38 and 39 complementary to the surfaces 34 and 35 on the plug members. When the plug members are in their engaged position as shown, the cam surfaces 35 and 39 are effective to urge the plug members inward with a relatively high mechanical advantage. As the plug members move out in response to a predetermined torque, the cam members 34 and 38 engage to decrease the mechanical advantage of the springs 37 over the plug members. They will, therefore, be held out in their disengaged position in response to a lower speed and/or lower torque than that required to move them initially. Plugs 33 may be made longer when desired to increase their weight thereby to make the coupling more speed responsive.

It will be noted that with all of the constructions above described, misalignment between the driving and driven shafts is permissible since the rounded ends of the balls or plug members will engage the notches 12 or 23 to form a driving connection between the driving and driven members regardless of the exact alignment thereof.

While several embodiments of the invention have been shown and described in detail herein, it will be understood that these are illustrative only and are not intended as definition of the scope of the invention, reference being had for this purpose to the appended claims.

What is claimed is:

1. A torque transmitting coupling comprising rotatable driving and driven members, one of the members being formed at its periphery with an outwardly facing cam notch, means in the other member forming a radially extending guide passage registering with the notch in one relative rotary position of the members, a coupling member movable in the passage into and out of engagement with the notch and urged away from the notch by centrifugal force thereon, a cam member carried by said other rotatable member movable in a path at an angle to the guide passage and engageable with the coupling member, and resilient means urging the cam member toward the coupling member to urge the coupling member toward the notch, the cam and coupling members being formed with cooperating cam surfaces arranged at a plurality of different angles sloping in the same direction from the line of motion of the coupling member and successively engageable in the engaged and disengaged positions of the coupling member to urge the coupling member toward the notch with different degrees of force in said different positions.

2. A torque transmitting coupling comprising rotatable driving and driven members, one of the members being formed at its periphery with an outwardly facing cam notch, means in the other member forming a radially extending guide passage registering with the notch in one relative rotary position of the members, a coupling member movable in the passage into and out of engagement with the notch and urged away from the notch by centrifugal force thereon, cam means carried by said other rotatable member and cooperating with the coupling member to urge it toward the notch, and resilient means acting on the cam means to urge it toward the coupling member, the cam means being formed with surfaces arranged at a plurality of different angles sloping in the same direction from the line of motion of the coupling member and successively effective in the engaged and disengaged positions of the coupling member to urge it toward the notch with different degrees of force in said different positions.

3. A torque transmitting coupling comprising a driven member formed at its periphery with an outwardly facing cam notch, a driving member having a body portion overlying the notch, a coupling member carried by the body portion for substantially radial movement toward and away from the notch, the body portion having a bore extending generally axially therein, a spring in the bore, and cam means connecting the spring to the coupling member including a cam part having surfaces arranged at different angles sloping in the same direction from the line of motion of the coupling member and successively effective in the engaged and disengaged positions of the coupling member to urge it toward the notch with different degrees of force in said different positions.

4. A torque transmitting coupling comprising a driven member formed at its periphery with an outwardly facing cam notch, a driving member having a body portion overlying the notch, a coupling member carried by the body portion for substantially radial movement toward and away from the notch, the body portion having a bore extending generally axially therein, a spring in the bore, and a cam member in the bore urged toward the coupling member by the spring, the cam and coupling members having cooperating cam surfaces arranged at a plurality of different angles sloping in the same direction from the line of motion of the coupling member and successively engageable in the engaged and disengaged positions of the coupling member to urge the coupling member toward the notch with different degrees of force in said different positions.

5. A torque transmitting coupling comprising a driven member having at its periphery an outwardly facing cam notch, a driving member having a body portion overlying the notch, the body portion having a substantially radially extending bore therein adapted to register with the notch, a ball slidable in the bore and engageable with the notch to connect the driving and driven members, a second bore in the body portion at an angle to the first bore, a spring in the second bore, and cam means connecting the spring to the ball including a second ball providing a plurality of different cam angles to urge the first ball toward the notch with different degrees of force in different positions of the first ball.

6. A torque transmitting coupling comprising a driven member having at its periphery an outwardly facing cam notch, a driving member having a body portion overlying the notch, the body portion having a substantially radially extending bore therein adapted to register with the notch, a ball slidable in the bore and engageable with the notch to connect the driving and driven members, a second bore in the body portion at an angle to the first bore, a second ball in the second bore engageable with the first ball, and a spring in the second bore urging the second ball toward the first ball.

7. A torque transmitting coupling comprising a driven member having at its periphery an outwardly facing cam notch, a driving member having a body portion overlying the notch, the body portion having a substantially radially extending bore therein adapted to register with the notch, a ball slidable in the bore and engageable with the notch to connect the driving and driven members, a second bore in the body portion at an angle to the first bore, a second ball in the second bore, a spring in the second bore urging the second ball toward the first bore, and a roller carried by the body portion for substantially radial movement interposed between and engaging the balls.

8. A torque transmitting coupling comprising a driven member having at its periphery an outwardly facing cam notch, a driving member having a body portion overlying the notch, the body portion having a substantially radially extending bore therein adapted to register with the notch, a coupling plug slidable in the bore formed with a curved inner end to engage the notch and with an outer end having a plurality of different cam angles sloping in the same direction from the line of motion of the plug, a cam member slidable in the body portion formed with a plurality of different cam angles engageable with and complementary to the cam angles at the outer end of the plug, and a spring urging the cam member toward the plug.

ADIEL Y. DODGE.
ROY W. HAYS.

REFERENCES CITED

The following references are of record in the file of this patent:

UNITED STATES PATENTS

| Number | Name | Date |
|---|---|---|
| 1,805,692 | Ferenci | May 19, 1931 |
| 1,710,694 | Ferenci | Apr. 30, 1929 |
| 2,263,709 | Van Sitlert | Nov. 25, 1941 |
| 1,579,057 | Asbury | Mar. 30, 1926 |
| 2,238,583 | Dodge | Apr. 15, 1941 |